United States Patent Office

2,853,485
Patented Sept. 23, 1958

2,853,485

PROCESS OF REACTING CARBOHYDRATES WITH VARIOUS REAGENTS IN THE PRESENCE OF 2-PYRROLIDONE OR N-METHYL - 2 - PYRROLIDONE

Jesse Werner, Holliswood, N. Y., and Frederick A. Hessel, Upper Montclair, N. J., assignors to General Aniline & Film Corporation, New York, N. Y., a corporation of Delaware No Drawing. Application May 19, 1955
Serial No. 509,681

14 Claims. (Cl. 260—234)

This invention relates to a new process of reacting carbohydrates with various reagents to produce a new class of compounds having utility in various chemical industries.

From the various carbohydrates available only two have attained utility in various chemical processing industries. Sorbital, 1,2,3,4,5,6-hexanehexol, has found use in pharmaceutical compounding, as a sugar substitute for diabetics, and in the manufacture of ascorbic acid, synthetic plasticizers, humectants, and the like. Mannitol obtained synthetically by the reduction of mannose or fructose is employed with boric acid in the manufacture of dry electrolytic condensers for radio application, as a resin plasticizer, and in the manufacture of mannitol hexanitrate. There are many carbohydrates which could be used successfully for various applications, but the lack of suitable synthesis to convert them to new and useful derivatives has discouraged their exploitation on a commercial basis. For example, the inulin group of carbohydrates occurring in the tubers of the Jerusalem artichoke and in other members of the composite family of plants has been hydrolyzed to fructose, a sugar 60% sweeter than sucrose, but there has been no commercial production of the sugar itself or its derivatives. Xylose which has been produced by the hydrolysis of xylan in cottonseed hulls has discouraged exploitation of the process due to the failure to find important uses for this sugar by itself or in the form of various chemical derivatives.

Most of the carbohydrates such as the monosaccharides, disaccharides, and trisaccharides are soluble in water. Some of them, while soluble in water, are also soluble or slightly soluble in alcohol. Many, however, are insoluble in alcohol and ether such as, for example, lactose, dextrose, and the like. Several monosaccharides require solution in glacial acetic acid before they can be converted into sugar derivatives. The action of acetyl chloride or acetyl bromide on glucose, or the action of hydrobromic acid on pentaacetyl glucose in the preparation of glucosides, requires the solution of the glucose in glacial acetic acid. In view of this shortcoming, it is impossible to prepare halide derivatives of the various carbohydrates because of the partial esterification of the hydroxyl groups with acetic acid. If attempts are made to esterify the hydroxyl groups in carbohydrates with halogen acids using dehydrating agents such as sulfuric acid or zinc chloride, hydrolysis of the carbohydrates will take place first. This is due to the fact that all carbohydrates such as pentose or hexose when heated with mineral acids yield furfural and ω-hydroxy-methyl furfural respectively. Sucrose in the presence of acids is hydrolyzed into d-glucose and d-fructose. Dilute mineral acids break down raffinose into fructose and melibiose. More powerful acid hydrolysis yields from each molecule of raffinose, one mloecule each of galactose, glucose and fructose.

The difficulty in transforming the various monosaccharides, disaccharides, and trisaccharides into new and useful derivatives is attributable to the failure to find a suitable inert solvent in which the polyhydroxy groups in the various carbohydrates would be amenable to reactivity with various chemical compounds. In the past such reactions have been extremely difficult, if not impossible, due to the insolubility of the various carbohydrates in non-reactive non-aqueous media.

It is an object of the present invention to provide an improved process of preparing carbohydrate derivatives by employing 2-pyrrolidone or N-methyl-2-pyrrolidone in which all of the carbohydrates including monosaccharides, disaccharides, and polysaccharides are soluble and which are inert to a chemical reagent reacting with one or more hydroxy groups in the carbohydrate molecule.

Other objects and advantages will become more clearly apparent from the following description.

We have discovered that all of the carbohydrates when dissolved in 2-pyrrolidone or N-methyl-2-pyrrolidone, hereinafter referred to merely as pyrrolidones for sake of brevity, react readily with various reagents to give a variety of new compounds which are useful in the chemical and pharmaceutical industries. By the employment of pyrrolidones as inert solvent-diluents, it is possible to react all carbohydrate with acid anhydrides, to give reaction products which are soluble in ether. One or more hydroxyl groups of the carbohydrates can be replaced by chlorine by means of phosphorus, tri- and penta-chloride, the corresponding iodides and bromides by treatment with phosphorus tri-iodide and phosphorus pentaiodide, and phosphorus tri-bromide and phosphorus pentabromide, respectively. The resulting halogen derivatives can be employed for the preparation of a variety of esters by reacting the halide groups with potassium cyanide to yield nitriles. With potassium hydrogen sulfide, the halogen derivatives yield thio alcohols.

The various carbohydrates in solution in the pyrrolidones may be subjected to alcoholysis, i. e. heating various aliphatic and aromatic esters with the carbohydrates under conditions to induce double decomposition in the presence of small amounts of acids. The carbohydrates in such solution may be esterified with various inorganic and organic acids to yield mono- and poly-esters. Nitrous anhydride may be employed to yield esters of nitrous acid. Various esters of phosphoric acid may be prepared by the action of silver phosphate on the halide derivatives of the various carbohydrates, or by the action of phosphorus oxychloride on one or more hydroxyl groups of the carbohydrates.

The most unusual feature of the present invention is that one or more hydroxyl hydrogens of the carbohydrates can be replaced by an alkali metal to yield the corresponding carbohydralates. These are readily formed from alkali metals and the hydroxyl groups of the carbohydrate with evolution of hydrogen. After evaporation, the alkali metal alcoholate is left as an amorphous powder. The alkali metals such as sodium, potassium, and lithium are very soluble in pyrrolidones, and polyalcoholates are readily formed if a carbohydrate in pyrrolidones is added to a solution of alkali metal in pyrrolidones. Instead of distilling the solution to remove the pyrrolidones, the alcoholates can be precipitated out of solution by the use of dioxane.

Since all carbohydrate halides and the alkali metal carbohydralates of the various carbohydrates are soluble in the pyrrolidones, this feature lends itself to the preparation of various types of ethers. For example, mono- and poly-alkali metal carbohydralates may be made to react with one or more molecular equivalents of an alkyl halide such as, methyl iodide to yield mono- and poly-methyl ethers of the corresponding carbohydrates. The various halide esters of the carbohydrates may likewise be reacted with the alkali metal carbohydralates to yield a new variety of symmetrical and unsymmetrical ethers. The halide derivatives of the various carbohydrates may be reacted with ammonia to yield amines. Amines may also be prepared by heating a solution of any carbohydrate in the pyrrolidone with zinc chloramine.

It is to be noted that the nature or character of the reagent, which is normally reactive with one or more hydrogens of hydroxy groups, is immaterial so long as the reagent is soluble or dispersible in the pyrrolidones. During the course of our experimentation with the pyrrolidones as inert-solvent diluents, we have noted that all of the currently available reagents such as halogen hydracids, e. g. hydrochloric acid, hydrobromic acid, hydroiodic acid and the like including acids such as nitrous acid, nitric acid, hypochloric acid, sulfuric acid, phosphoric acid, boric acid, silicic acid, unsaturated and saturated mono- and poly-carboxylic acids and their anhydrides such as, for example, acetic acid, propionic acid, butyric acid, caproic acid, capric acid, acrylic acid, vinyl acetic acid, methyl acrylic acid, tetracrylic acid, erucic acid, sorbic acid, maleic acid, fumaric acid, adipic acid, sebacic acid, citraconic acid, tricarballylic acid, aconitic acid, ethylene tetracarboxylic acid and the like may be employed. Acylating agents such as formyl chloride, acetyl chloride, propionyl chloride, butyl chloride, stearoyl chloride, benzoyl chloride and the like, can be employed as the reagents to react with one or more hydroxyl groups of all carbohydrates and their equivalents.

As examples of carbohydrates which are soluble in the pyrrolidones, and the resulting solutions subject to any one of the forgoing reactions, the following is merely illustrative:

MONOSACCHARIDES

The following are neutral compounds readily soluble in water and difficultly soluble in alcohol, and insoluble in ether:

| | |
|---|---|
| d-Arabinose | d-Galactose hydrate |
| l+-arabinose | d-Fructose |
| dl-arabinose | l+-fructose |
| l+-xylose | dl-Fructose (x-acrose) |
| d-xylose | d−-Sorbose |
| dl-xylose | l+-sorbose |
| α-Rhamnose (methyl-pentose) | dl-Sorbose |
| | d-Tagatose |
| Rhamnose hydrate | dl-Tagatose |
| α-d-Glucose | Glucoheptose |
| β-d-Glucose | Mannoheptose |
| d-Glucose hydrate | Galaheptose |
| l-glucose hydrate | Rhamnoheptose (methyl-heptose) |
| dl-Glucose | |
| α-d-Mannose | Glucooctose |
| d-Mannose hydrate | Mannooctose |
| l-mannose hydrate | Galaoctose |
| dl-Mannose | Glucononose |
| α-d-Galactose | Mannononose |
| β-d-Galactose | |

DISACCHARIDES

| | |
|---|---|
| Lactose | Melibiose |
| Maltose | Trehalose |
| Saccharose | |

TRISACCHARIDES

| | |
|---|---|
| Lupeose | Raffinose |
| Stachyose | Gentianose |

POLYSACCHARIDES

| | |
|---|---|
| Achroödextrins | Lichenins |
| Erythrodextrins | Pentosans |
| Inulins | Hexosans |
| Glycogens | |

The following examples will serve to show how the process of our invention may be carried out to yield a new class of carbohydrate derivatives. It is to be understood that these examples are merely illustrative and are not to be construed as being limitative.

Example I 0.3 gram of sodium metal was added to 5.0 grams of N-methyl-2-pyrrolidone, and the mixture heated until solution was complete. 1.0 gram of sucrose was then added and the batch heated until solution was complete. A clear, yellow solution results. This solution, soluble in both water and ethanol, yields a white precipitate of sodium sucrosate when added to dioxane. It is to be noted that a solution of sucrose in N-methyl-2-pyrrolidone is colorless and soluble in dioxane.

The sodium sucrosate is either isolated as a white powder or it may be further reacted with alkyl halides while in solution in N-methyl-2-pyrrolidone. Other carbohydrates may be substituted for sucrose in this reaction, to yield interesting and useful chemical intermediates. They may be reacted with alkyl or aryl halides to yield the corresponding ethers, or they may be reacted with acid chlorides to yield the corresponding esters.

Example II 5.0 grams of sucrose were added to 10.0 grams of N-methyl-2-pyrrolidone, and the mixture heated until solution was complete. To this solution was added 31.0 grams of stearyl chloride and the mixture heated until the stearyl chloride dissolved. After about one minute of continued heating, an amber color began to form, accompanied by an exothermic reaction and a copious evolution of hydrogen chloride. Heating, which was discontinued during the exotherm, was then reapplied after evolution of heat and gases had stopped, to insure completeness of reaction. The batch was drowned in one liter of water, to yield a heavy brown precipitate, which was filtered and washed with warm water, and then air dried for forty-eight hours. The resulting octa-stearyl sucrose was obtained in a yield of 95% of theoretical. It is a high molecular weight, low melting (less than 50° C.) waxy solid.

This compound may be used as a relatively inexpensive plasticizer or in water-repellant compositions.

Its use as a plasticizer may be shown as follows:

60.0 grams of polyvinyl chloride, 15.0 grams of di-n-octyl phthalate and 20.0 grams of octa-stearyl sucrose were intimately mixed, and the mixture slowly added to a 2-roll plastics mill. One roll was kept at 230° F., the other at 300° F. The mixture milled readily, and the final product, in the form of a sheet, appeared as a compatible continuous film.

Its use as a water-repellant may be shown as follows: 0.2 gram of octa-stearyl sucrose is added to 10.0 cc. of tetrahydrofuran to form an amber solution. Several two by four strips of untreated cotton were treated with the solution for thirty seconds. The strips were removed and allowed to air dry for twenty minutes. The cotton had a very faint beige color. All strips were tested by placing drops of water on their surfaces. In all cases, after one hour standing, all drops remained spherical, and did not wet the cloth.

Example III

Example II was repeated with the exception that the quantity of stearyl chloride was decreased to 15.5 grams. The resulting tetra-stearyl sucrose was a waxy solid.

It is to be noted that the reactions of Examples II and III may be conducted by using sufficient quantities of stearyl chloride to yield products containing from one to eight stearyl groups. All such products appear as waxy solids, with the melting point decreasing as the number of stearyl groups increases, and at the same time the water solubility or sensitivity decreases.

Compounds containing one or two stearyl groups have been shown to have definite surface active properties. When shaken with water they produce a rather stable foam.

*Example IV*

1.0 gram of sucrose was added to 5.0 grams of N-methyl-2-pyrrolidone and the mixture heated until solution was complete. The resulting solution is water-soluble, but yields a white precipitate of sucrose from carbon tetrachloride. To this solution was then added 5.0 cc. of acetic anhydride and 0.1 gram of sodium methylate, and the mixture heated to the boil for several minutes. The resulting solution, now straw colored and although still water soluble, gave no precipitate when added to carbon tetrachloride. The resulting product is probably the tetra-acetate of sucrose.

The acetates of sucrose and other saccharides are products commercially available and in use today in adhesive compositions and as plasticizers.

*Example V*

One-tenth molecular equivalent of sucrose and six-tenths molecular equivalent of maleic anhydride were added to 200 cc. of N-methyl-2-pyrrolidone and heated under reflux at a temperature of 200–205° C. for two hours. The reaction mixture was then drowned in two liters of water, and then filtered and washed with warm water, whereby a tan precipitate was obtained which was identified as a high molecular weight addition compound having the probable formula:

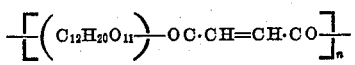

The above compound has use as plasticizers for plastics, fiber forming materials, etc., depending upon molecular weight and further possible reaction, such as cross-linking through the unsaturated bond with polymerizable vinyl compounds such as styrene, etc.

*Example VI*

Example II was repeated with the exception that N-methyl-2-pyrrolidone was replaced by 2-pyrrolidone. The resulting octa-stearyl sucrose was obtained in a yield of 92%, and appeared identical with the compound obtained in Example II.

It is to be noted that any other carbohydrate, such as inulin, lactose, fructose, etc., may be substituted for sucrose in the above reaction, and that the amount of stearyl chloride may be varied to yield products containing one or more stearyl groups. It is also to be noted that stearyl chloride may be substituted by other acid chlorides containing from two to sixteen carbon atoms, to yield related products.

*Example VII*

1.0 gram of sucrose was added to 5.0 grams of N-methyl-2-pyrrolidone and the mixture warmed until solution was complete. The resulting solution was water-white and water soluble. 3.0 cc. of sulfuryl chloride was added and an exothermic reaction occurred giving a clear yellow solution, which on drowning in water yielded a white precipitate. This precipitate was identified as a partially chlorinated sucrose.

Chlorinated saccharides, as prepared above are useful intermediates in organic synthesis. For example, they may be further reacted through remaining hydroxy groups, for instance, with maleic anhydride to yield high molecular weight compounds containing chlorine, which will improve properties such as chemical resistance and flame resistance.

*Example VIII*

1.0 gram of sucrose was dissolved in 10.0 grams of 2-pyrrolidone. To the solution was added 1.0 gram of 1,4-dichloro-2-butyne and the solution heated with stirring for one-half hour. On drowning in water, a white precipitate is obtained which is isolatd by filtration. The reaction product was identified as having the following general formula:

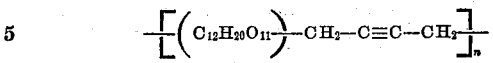

The cross-linked carbohydrate, as prepared above, has increased water resistance. It may be further reacted with polyamines through the unsaturated bond to yield adhesives, fiber-forming materials, etc.

*Example IX*

To a 500 cc. flask, equipped with thermometer, stirrer and condenser, 68.0 grams of sucrose, 18.0 grams of cottonseed oil, 0.25 gram of sodium methylate and 300 grams of N-methyl-2-pyrrolidone were added and the mixture heated with stirring at 150–170° C. for five hours. At the end of this time, a portion of the reaction mixture was drowned in water. No precipitate appeared, but the yellow solution has excellent foaming properties. By partial evaporation and addition of sodium chloride, a white precipitate was salted out. This product is water soluble, and imparts excellent foaming properties to the solution. It can be employed as a foaming or sudsing agent.

*Example X*

Example I may be repeated with the exception that 10 grams of sucrose is replaced by an equivalent amount of d-glucose. The resulting product is the sodium glucosate having the general formula:

*Example XI*

Example II may be repeated with the exception that 5 grams of sucrose is replaced by an equivalent amount of l-rhamnose. The resulting octa-stearoyl rhamnose is a high molecular weight, low melting waxy solid.

*Example XII*

Example II may be repeated with the exception that 5 grams of sucrose is replaced by an equivalent amount of d-threose to yield tetrastearoyl-threose which is a waxy solid.

*Example XIII*

Example IV may be repeated with the exception that one gram of sucrose is replaced by an equivalent amount of raffinose. The resulting product is probably the tetracetate of raffinose.

*Example XIV*

Example V may be repeated with the exception that one-tenth molecular equivalent of sucrose is replaced by one-tenth molecular equivalent of inulin. The tan precipitate which was obtained is a high molecular weight addition compound having the probable general formula:

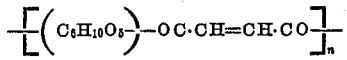

From the foregoing specification and working examples, it becomes clearly manifest that numerous reactions involving one or more hydroxyl groups of not only the carbohydrates disclosed herein but various polyhydroxy organic compounds such as erythritol, arabitol, xylitol, adonitol, mannitol, dulcitol, sorbitol, and the like can be readily achieved to yield new derivatives having diversified uses in the chemical industry.

We claim:

1. The process of reacting at least one hydroxy group of a polyhydroxy organic compound selected from the group consisting of mono-, di-, tri- and poly- saccharides with a reagent reactive with said hydroxy group and soluble or dispersible in pyrrolidones which comprises conducting the reaction in the presence of a pyrrolidone selected from the group consisting of 2-pyrrolidone and N-methyl-2-pyrrolidone.

2. The process of reacting at least one hydroxy group of sucrose with a reagent reactive with said hydroxy group and soluble or dispersible in pyrrolidones which comprises conducting the reaction in the presence of a pyrrolidone selected from the group consisting of 2-pyrrolidone and N-methyl-2-pyrrolidone.

3. The process of reacting at least one hydroxy group of d-glucose with a reagent reactive with said hydroxy group and soluble or dispersible in pyrrolidones which comprises conducting the reaction in the presence of a pyrrolidone selected from the group consisting of 2-pyrrolidone and N-methyl-2-pyrrolidone.

4. The process of reacting at least one hydroxy group of d-threose with a reagent reactive with said hydroxy group and soluble or dispersible in pyrrolidones which comprises conducting the reaction in the presence of a pyrrolidone selected from the group consisting of 2-pyrrolidone and N-methyl-2-pyrrolidone.

5. The process of reacting at least one hydroxy group of raffinose with a reagent reactive with said hydroxy group and soluble or dispersible in pyrrolidones which comprises conducting the reaction in the presence of a pyrrolidone selected from the group consisting of 2-pyrrolidone and N-methyl-2-pyrrolidone.

6. The process of reacting at least one hydroxy group of d-xylose with a reagent reactive with said hydroxy group and soluble or dispersible in pyrrolidones which comprises conducting the reaction in the presence of a pyrrolidone selected from the group consisting of 2-pyrrolidone and N-methyl-2-pyrrolidone.

7. The process according to claim 1 wherein the pyrrolidone is 2-pyrrolidone.

8. The process according to claim 1 wherein the pyrrolidone is N-methyl-2-pyrrolidone.

9. The process of reacting at least one hydroxy group of sucrose with metallic sodium which comprises conducting the reaction in the presence of N-methyl-2-pyrrolidone.

10. The process of reacting at least one hydroxy group of sucrose with stearyl chloride which comprises conducting the reaction in the presence of N-methyl-2-pyrrolidone.

11. The process of reacting at least one hydroxy group of sucrose with acetic anhydride which comprises conducting the reaction in the presence of N-methyl-2-pyrrolidone.

12. The process of reacting at least one hydroxy group of sucrose with maleic anhydride which comprises conducting the reaction in the presence of N-methyl-2-pyrrolidone.

13. The process of reacting at least one hydroxy group of sucrose with sulfuryl chloride which comprises conducting the reaction in the presence of N-methyl-2-pyrrolidone.

14. The process of reacting at least one hydroxy group of sucrose with 1,4-dichloro-2-butyne which comprises conducting the reaction in the presence of 2-pyrrolidone.

References Cited in the file of this patent

UNITED STATES PATENTS

| | | |
|---|---|---|
| 2,077,371 | Rheineck et al. | Apr. 13, 1937 |
| 2,602,789 | Schwartz et al. | July 8, 1952 |

FOREIGN PATENTS

| | | |
|---|---|---|
| 689,444 | Great Britain | Mar. 25, 1953 |